Patented June 2, 1931

1,808,578

UNITED STATES PATENT OFFICE

WALDO L. SEMON, OF CUYAHOGA FALLS, OHIO, ASSIGNOR TO THE B. F. GOODRICH COMPANY, OF NEW YORK, N. Y., A CORPORATION OF NEW YORK

RUBBER COMPOSITION AND METHOD OF PRESERVING RUBBER

No Drawing.    Application filed January 17, 1930.  Serial No. 421,597.

This invention relates to the art of preserving rubber, either in a vulcanized or unvulcanized condition, and to rubber compositions so preserved.

It is well known that rubber deteriorates more or less rapidly upon aging, especially when exposed to light, heat, or air. It has heretofore been proposed to retard such deterioration by treating the rubber, either before or after vulcanization, with so-called "anti-oxidants". An object of this invention is accordingly to provide a new class of anti-oxidants which is far more effective in retarding the deterioration of rubber than the anti-oxidants which have hitherto commonly been employed.

This invention, in brief, consists in treating rubber with a member of a new class of anti-oxidants, comprising halogen substituted diarylamines. For example, this class includes such compounds as: p-chlor-diphenylamine, p-chlorphenyl-p-toluidine, o-chlor-diphenylamine, o,o'-dichlor-di-p-tolyl-amine, p-brom-diphenylamine, p,p'-dibrom-diphenylamine, p-chlor-phenyl-beta-naphthylamine, p-tolyl-4 chlor-naphthylamine 1, p,p'-dichlor-diphenyl-p-phenylene-diamine, p-chlorphenyl-biphenylamine, etc. Although such substituted amines in general exhibit valuable anti-oxidant properties, it is preferred to employ such as contain the substituent in the para position relative to the secondary amino group, since the para substituted secondary amines are more active as anti-oxidants than the ortho compounds, which in turn are more active than the meta compounds.

When incorporated into rubber compositions before vulcanization, the above-mentioned halogen substituted diarylamines are extremely effective in retarding their deterioration, compositions so treated being capable of withstanding the deleterious effect of exposure to oxidizing materials or to the elements without sensible deterioration for a far longer period than untreated compositions. The anti-oxidants are preferably employed in the proportions of from $\frac{1}{10}$ part to 5 parts by weight for every 100 parts of rubber.

As a specific example of one embodiment of the method of this invention, a typical tire tread composition was prepared containing: blended plantation rubbers 100 parts by weight, sulfur 5.5 parts, zinc oxide 30 parts, gas black 40 parts, mineral rubber 10 parts, palm oil 5 parts, and hexamethylene tetramine 0.75 parts. A portion of the composition was used as a control while 0.95 parts (0.5% of the weight of the composition) of one of the above-described anti-oxidants were added to other portions. The compositions were thoroughly mixed, and vulcanized in a press for 45 minutes at 145° C. (294° F.) to produce an optimum cure. The relative rates of aging of the vulcanized compositions were compared by measuring their respective tensile strengths and elongations before and after aging. Accelerated aging tests were carried out in the Geer ageing oven, in which samples were maintained at a temperature of 70° C. (158° F.) in a constantly renewed stream of air, as well as in the Bierer-Davis bomb, in which other samples were maintained at the same temperature (70° C.) in an atmosphere of oxygen at a pressure of 300 lbs. per sq. in. In the table below T indicates ultimate tensile strength in pounds per sq. in. and E indicates ultimate elongation in percent of original length.

*Aging tests of substituted diarylamines*

| Anti-oxidant (0.5%) | Before aging | | After 7 days in the Geer oven | | After 48 hrs. in the Bierer-Davis bomb | |
|---|---|---|---|---|---|---|
| | T | E | T | E | T | E |
| None (control) | 3525 | 662 | 2041 | 476 | 815 | 340 |
| tribromphenyl-alpha naphthylamine | 3634 | 690 | 2173 | 493 | 1548 | 480 |
| p,p'dibrom-di-phenyl-amine | 3513 | 633 | 2817 | 530 | 2246 | 530 |
| o-chlorphenyl-beta-naphthylamine | 3334 | 673 | 1903 | 497 | 1695 | 510 |
| p-chlorphenyl-beta-naphthylamine | 3677 | 683 | 3241 | 567 | 2701 | 603 |
| p-chlorphenyl-alpha-methyl-beta-naphthylamine | 3773 | 650 | 2605 | 517 | 2000 | 557 |

It is evident from the above examples that rubber compositions containing even small proportions of the anti-oxidants of this invention resist deterioration far more effectively than the similar untreated compositions.

Obviously, the practice of this invention is not limited to the specific compositions given above, such compositions being merely illustrative of one manner of employing the anti-oxidants of this invention. The proportions of the constituents may be varied, or other substances may be substituted therefor, since this invention is applicable to pure rubber or rubber compositions of the most varied nature. The anti-oxidants may be applied to unvulcanized or vulcanized rubber with good effect on the age-resisting properties of the rubber, such as by applying them to the surface of the rubber, as for example in solution, or in the form of a paste or emulsion.

It is to be understood that the term "treating" as employed in the appended claims is used in a generic sense to include either the incorporation of the anti-oxidants into the rubber by milling or similar process, or their addition to the rubber latex before the coagulation, or to the application thereof to the surface of a mass of crude or vulcanized rubber. The term "rubber" is likewise employed in the claims in a generic sense to include caoutchouc, whether natural or synthetic, reclaimed rubber, balata, gutta percha, rubber isomers and like products, whether or not admixed with fillers, pigments, vulcanizing or accelerating agents.

While I have herein disclosed certain preferred manners of performing my invention, I do not thereby desire or intend to limit myself solely thereto, for, as hitherto stated, the precise proportions of the materials utilized may be varied and other materials having equivalent chemical properties may be employed if desired without departing from the spirit and scope of the invention as defined in the appended claims.

I claim:

1. The method of preserving rubber which comprises treating rubber with a halogen substituted diarylamine.

2. The method of preserving rubber which comprises treating rubber with a halogen substituted diarylamine, at least one of the substituents being located in the para position relative to the amino group.

3. The method of preserving rubber which comprises treating rubber with a halogen substituted aryl-naphthylamine.

4. The method of preserving rubber which comprises treating rubber with a halogen substituted phenyl naphthylamine.

5. The method of preserving rubber which comprises treating rubber with a mono-halogen substituted phenyl naphthylamine, the halogen being located on the phenyl group in the para position relative to the amino group.

6. The method of preserving rubber which comprises treating rubber with a p-chlorphenyl naphthylamine.

7. The method of preserving rubber which comprises treating rubber with p-chlorphenyl-beta-naphthylamine.

8. A composition of matter comprising rubber and a halogen substituted diarylamine.

9. A composition of matter comprising rubber and a halogen substituted diarylamine, at least one of the substituents being in the para position relative to the secondary amino group.

10. A composition of matter comprising rubber and a halogen substituted aryl-naphthylamine.

11. A composition of matter comprising rubber and a halogen substituted phenyl-naphthylamine.

12. A composition of matter comprising rubber and a mono-halogen substituted phenyl-naphthylamine, the halogen being located in the para position relative to the secondary amino group.

13. A composition of matter comprising rubber and a p-chlorphenyl-naphthylamine.

14. A composition of matter comprising rubber and p-chlorphenyl-beta-naphthylamine.

15. A vulcanized rubber product resulting from the vulcanization of a composition comprising rubber, a vulcanizing agent, an accelerator of vulcanization, and a halogen substituted diarylamine.

16. A vulcanzed rubber product resulting from the vulcanization of a composition comprising rubber, a vulcanizing agent, an accelerator of vulcanization, and a halogen substituted phenyl-naphthylamine.

17. A vulcanized rubber product resulting from the vulcanization of a composition comprising rubber, a vulcanizing agent, an accelerator of vulcanization, and p-chlorphenyl-beta-naphthylamine.

In witness whereof I have hereunto set my hand this 9th day of January, 1930.

WALDO L. SEMON.